United States Patent
Leach et al.

(10) Patent No.: US 10,049,079 B2
(45) Date of Patent: Aug. 14, 2018

(54) SYSTEM AND METHOD FOR DETERMINING WHETHER TO MODIFY A MESSAGE FOR REROUTING UPON RECEIPT AT A CURRENT TARGET PROCESSOR

(75) Inventors: Stephen Frederick Knight Leach, North Somerset (GB); James Arthur Dean Wallace Anderson, Reading (GB)

(73) Assignees: Stephen Leach, North Somerset (GB); James Anderson, Reading (GB)

(*) Notice: Subject to any disclaimer, the term of this patent is extended or adjusted under 35 U.S.C. 154(b) by 1616 days.

(21) Appl. No.: 13/144,653

(22) PCT Filed: Jan. 15, 2010

(86) PCT No.: PCT/GB2010/050064
§ 371 (c)(1),
(2), (4) Date: Oct. 6, 2011

(87) PCT Pub. No.: WO2010/082067
PCT Pub. Date: Jul. 22, 2010

(65) Prior Publication Data
US 2012/0017068 A1    Jan. 19, 2012

(30) Foreign Application Priority Data
Jan. 16, 2009    (GB) .................................. 0900667.7

(51) Int. Cl.
*G06F 15/173* (2006.01)
*H04L 12/721* (2013.01)
(Continued)

(52) U.S. Cl.
CPC .. *G06F 15/17312* (2013.01); *G06F 15/17337* (2013.01); *H04L 45/00* (2013.01); *H04L 45/74* (2013.01)

(58) Field of Classification Search
CPC .... H04L 45/00; H04L 45/74; G06F 15/17312
(Continued)

(56) References Cited

U.S. PATENT DOCUMENTS

| 3,755,789 A | 8/1973 | Collins |
| 4,814,980 A | 3/1989 | Peterson et al. |

(Continued)

FOREIGN PATENT DOCUMENTS

| CN | 1645352 A | 7/2005 |
| CN | 1694431 A | 11/2005 |

(Continued)

OTHER PUBLICATIONS

Costa etal., "Hop by Hop Multicast Routing Protocol", Aug. 2001, pp. 249-259.*

(Continued)

*Primary Examiner* — David J Huisman
(74) *Attorney, Agent, or Firm* — William J. Clemens; Shumaker, Loop & Kendrick, LLP

(57) ABSTRACT

A processing system includes a plurality of processors and a bus to carry messages between the processors, wherein each of the processors has an operating instruction memory field holding stored operating instructions including a re-routing target address. Each processor is arranged to receive a message including operating instructions including a current target address and on receipt of the message operate as a current processor arranged to: check whether the current target address corresponds to an address associated with the current processor; if the current target address in the message does correspond to the address associated with the current processor, check the operating instructions in the message to determine whether the message is to be re-routed; and, if the message is to be re-routed, replace operating instructions within the message with the stored (Continued)

operating instructions, and place the message on the bus for delivery to the re-routing target address.

20 Claims, 6 Drawing Sheets

(51) Int. Cl.
*H04L 12/741* (2013.01)
*H04L 12/701* (2013.01)

(58) Field of Classification Search
USPC .............. 712/10, 11, 12, 28; 709/238, 239; 370/389, 390, 392
See application file for complete search history.

(56) References Cited

U.S. PATENT DOCUMENTS

| | | | |
|---|---|---|---|
| 4,922,408 A | 5/1990 | Davis et al. | |
| 5,101,480 A | 3/1992 | Shin et al. | |
| 5,105,424 A | 4/1992 | Flaig et al. | |
| 5,347,633 A * | 9/1994 | Ashfield et al. | 709/238 |
| 6,625,773 B1 * | 9/2003 | Boivie et al. | 714/749 |
| 6,891,828 B2 * | 5/2005 | Ngai | 370/357 |
| 8,230,109 B2 * | 7/2012 | Van Elburg et al. | 709/238 |
| 8,891,549 B1 * | 11/2014 | Subramanian | 370/463 |
| 2005/0160253 A1 | 7/2005 | Lescure | |
| 2007/0206618 A1 | 9/2007 | Zelig et al. | |
| 2007/0268913 A1 | 11/2007 | Denecheau et al. | |
| 2008/0219203 A1 | 9/2008 | Chou et al. | |
| 2008/0247397 A1 * | 10/2008 | Gillet | H04L 45/04 370/392 |
| 2010/0014444 A1 * | 1/2010 | Ghanadan et al. | 370/310 |
| 2010/0111088 A1 * | 5/2010 | Olofsson | G06F 15/17381 370/392 |

FOREIGN PATENT DOCUMENTS

| | | | |
|---|---|---|---|
| JP | H0296259 A | 4/1990 | |
| JP | H03229381 A | 10/1991 | |
| JP | S63263938 A | 10/1998 | |
| JP | 2002044134 A * | 2/2002 | H04L 12/56 |
| JP | 2008289126 A | 11/2008 | |
| WO | 02/28023 A2 | 4/2002 | |
| WO | 2008/145995 A2 | 12/2008 | |

OTHER PUBLICATIONS

Wikipedia, "Message Passing Interface", Jan. 7, 2009, 14 pages.*
Wikipedia, "Network on a chip", Dec. 3, 2008, 4 pages.*
Jerger et al., "Virtual Circuit Tree Multicasting: A Case for On-Chip Hardware Multicast Support", Jun. 2008, pp. 229-240.*
Samman et al., "Networks-On-Chip Based on Dynamic Wormhole Packet Identity Mapping Management", VLSI Design, vol. 2009, Article ID 941701, 15 pages, 2009.*

* cited by examiner

SYSTEM AND METHOD FOR DETERMINING WHETHER TO MODIFY A MESSAGE FOR REROUTING UPON RECEIPT AT A CURRENT TARGET PROCESSOR

The present invention relates to communication between processors.

Typically communication between processors is arranged as the transmission of a packet composed of a header and data. The packet is sent from a single source processor and may be sent to a single destination processor; to a fixed number of destination processors, commonly two; to all processors in an acyclic graph (tree) of processors; to all processors in a cyclic graph (loop) of processors; or it may be broadcast to all processors in an arbitrary graph in the expectation that some of the processors are prepared to accept the packet. Communication may also be via memory when a processor stores data in memory and a processor fetches data from memory.

Some prior art systems will now be described. These use a number of common principles, seven of which are identified, and features of the systems described which use the same principles are identified by the same reference numerals from (i) to (vii). When a packet is sent from its source to a single destination, the header may encode the destination and/or the source. Source processors may (i) forward the packet without modifying it. Alternatively, they may use information in the header to look up an intermediate destination. The packet may then be (ii) sent directly to the processor at the intermediate destination. This implies that a source processor has access to a dedicated route to an intermediate processor. Alternatively, (iii) the address of the intermediate processor may be added to the header, before the packet is sent on its way via (ii) a dedicated or (iv) a widely accessible route. Adding information to the header makes the header longer. It can be seen that sending a packet from a single source to a single destination, using methods known in the art, is either (i) a fixed operation or else (ii) it implies having a dedicated route or else (iii) it implies that the header is of variable size. The routing of a packet from a single source to a fixed number of destinations is essentially similar.

When a packet is sent from its source to all processors in a tree it may be (ii) sent on a dedicated route or (iii) all of the destinations in the tree may be encoded in a variable length header. These alternatives, (ii) and (iii), are the same as above. The routing of a packet from a single source to all processors in a loop is essentially similar.

When a packet is broadcast from its source to all processors in a graph (v) the packet is delivered to many processors but, generally, only some of the processors accept the packet. This generally implies that routes to some or all of the non-accepting processors are wasted.

When a processor sends data to memory it commonly sends the data to the destination address via (iv) a widely accessible route. It may send the data to a single address or it may send data indirectly via a second and a third distinct addresses. In principle (vi) any number of indirections that is fixed and known at the source could be used. But, in the art, this does not exceed three addresses: two indirect addresses and one final address, all of which addresses are distinct. The alternative, (iv), is the same as above. The fetching of data from memory is similar.

A processor may also send data to memory via a sequence of caches. In this case (i) a packet composed of the address and data is unmodified, and is (ii) sent via a direct route to a fixed sequence of caches until the memory transaction is complete. These alternatives, (i) and (ii), are the same as above. The fetching of data from memory via a sequence of caches is essentially similar.

In all of the above communication methods, (vii) a packet may be delivered to an intermediate processor and/or it may be passed on to a successor processor. However, in some embodiments of a computer architecture of our own devising, which we have simulated in software, we provide an apparatus for communicating between processors which we find reduces, by up to 30%, the number of instructions needed by our parallel computer to execute a given program, as compared to any combination of the above communication methods known in the art. More generally, some embodiments of our invention improve the performance of a class of parallel computers. Some embodiments of our apparatus allow a packet to be modified or to be (i) fixed; to be sent via (ii) a dedicated or (iv) a widely accessible route to one or more processors; but do not require the header to (iii) vary in size; they do allow (v) a packet to be broadcast. They allow any number of, not necessarily distinct, indirections to be used, that number not being known or fixed at the source, in contrast to (vi). They do allow (vii) a packet to be delivered to an intermediate processor and/or to a successor processor. In short, in some embodiments of our invention, many of the communication methods known in the art are allowed, but are made more efficient for applications in parallel computing, by using a fixed size of header, whose contents may be modified, and by allowing a number of, not necessarily distinct, indirections which are generally not known or fixed at the source. In this way an arbitrarily complex route is defined which can be followed by a message having a fixed length header.

Accordingly the present invention provides a processing system comprising a plurality of processors and communication means arranged to carry messages between the processors. Each of the processors may have an operating instruction memory field arranged to hold stored operating instructions, which may including a re-routing target address. Each processor may also be arranged to receive a message including operating instructions, which may include a target address. On receipt of the message each processor may be arranged to perform any one or more of the following steps: check the target address in the message to determine whether it corresponds to an address associated with the processor; if the target address in the message does correspond to a target address associated with the processor, to check the operating instructions in the message to determine whether the message is to be re-routed; and if the message is to be re-routed to replace operating instructions within the message with the stored operating instructions, and place the message on the communication means for delivery to the re-routing target address.

The target address may comprise a processor address, or it may comprise the address of a register or other memory field associated with a particular processor. For example it may comprise a high level address field indicating a processor, and a low level address field which may indicate a register or other memory field within the processor, or may not be associated with any specific register or memory field within the processor. In this case it includes both a processor address and a register or memory field address.

The present invention further provides a processing system comprising a plurality of processors, which may form an array, and a communication means, which may be a pipe, arranged to carry messages between the processors, wherein each of the processors has a re-routing address memory field arranged to hold a processor address. Each processor may also have a delivery instruction memory field arranged to hold a delivery instruction. Each processor may be arranged to receive a message including a target address and a re-routing instruction. Each processor may be arranged, on receipt of the message to check the target address to determine whether it corresponds to the processor's own address. If the target address does correspond to the processor's own address, the processor may be arranged to check the re-routing instruction to determine whether the message is to be re-routed. If the message is to be re-routed the processor may be arranged to put the re-routing address into the message. This may replace a re-routing address in the message. It may be arranged to put the delivery instruction into the message to indicate to the processor at the re-routing address whether it is to re-route the message. It may then place the message on the communication means for delivery to the re-routing address.

Each processor may be arranged, if the message is to be re-routed, to replace an address, which may be a processor address, and which may be a used address, within the message with the re-routing address. The used address may be the processor's own address or associated with the processor. The message may include a routing address field holding at least one address, which may comprise a processor address, for use in routing the message, including the target address, and if the message is to be re-routed the address which the processor is arranged to replace with the re-routing address may be an address held in the routing address field. This enables the length of the message to remain the same, for example including a fixed number of address fields, which may be one field or a plurality of fields, containing a fixed number of addresses, which again may be one or a plurality, as it is transmitted between processors. The length of the message can therefore be independent of the length of the route which it is to follow. If there is only one address field, then the address in that field will generally be the target address, and the processor may be arranged to replace the target address in the received message, which will generally be its own address or associated with it, with the re-routing address, so that the re-routing address forms the target address in the re-routed message. If there is more than one address field within the message, then the re-routing address stored at the processor may replace the processor's own address as target. Alternatively it may replace another address, for example an address which has previously been used as a target address. In other words, the re-routing address may be used to form the target address of the re-routed message, or it may be inserted into the message for use as a target address in a subsequent re-routing.

The operating or delivery instruction in the message may include a re-routing instruction. The stored operating instruction may include a further re-routing instruction, Each processor may be arranged, if the message is to be re-routed, to replace a re-routing instruction within the message, which may be a used re-routing instruction, with the further re-routing instruction from the operating or delivery instruction memory field.

The operating or delivery instruction may comprise a store instruction indicating whether the message is to be stored at the processor at the re-routing address.

Each processor may be arranged to determine from the message whether the message is to be stored, and if it is, to store at least a part of the message. Each message may be arranged to determine from a delivery instruction or operating instruction in the received message whether the message is to be stored. The operating instruction or delivery instruction may include a re-routing instruction.

Each of the processors may be further arranged to perform an instruction using a part of the message as an input.

The processor may have a further address memory field arranged to hold a further re-routing address and, if the message is to be re-routed, the processor may be arrange to place the message on the communication means for delivery, or re-routing, to the further re-routing address.

The delivery instruction or re-routing instruction may have a fixed number of possible states indicating, preferably independently of the processor at which it is stored and the re-routing address to which it is to be sent, whether the message is to be re-routed at the processor at the re-routing address. The delivery instruction, or the store instruction, may also indicate, preferably in a similarly consistent way, whether the message is to be stored at the processor at the re-routing address.

The communication means may comprise a pipe and may comprise a plurality of frames and be arranged to move the data and/or the control tokens between frames to move them along the communication means. Each processor may have one or more of the frames associated with it from which data can be written to the processor.

The data may be carried on the communication means in the form of data tokens.

Each processor may be arranged to perform the same instruction as every other processor. Each processor may be arranged to perform only one instruction. Each time that each processor performs its instruction it may be able to identify no, one, or more than one, data target processor, and no, one, or more than one control target processor. This can enable it to transmit data to multiple processors in parallel. The communication means may be arranged to transmit the result to the identified data target processor so that it can be written into the data target processor.

Each processor may be arranged to transmit a control token by writing it to the communication means together with the address of the control target processor to which it is to be transmitted. Each processor may be able, on performing the instruction, to identify a plurality of control target processors to which it can transmit control tokens in parallel.

Each processor is preferably arranged, when it has transmitted the result and a control token to any identified target processors, to give up possession of its control token so that it will not perform the instruction again until it receives another control token.

The instruction may be a multiply-add of the form $a \times b + c \rightarrow r'$.

Each processor may be arranged to select any control processors on the basis of the result r'. For example each processor may be arranged to determine whether the result r' is less than zero, zero, greater than zero, or nullity (as defined in J. A. D. W. Anderson, Norbert Völker, Andrew A. Adams "*Perspex Machine VIII: Axioms of Transreal Arithmetic*" in *Vision Geometry XV*, Longin Jan Lateki, David M. Mount, Angela Y. Wu, Editors, *Proceedings of SPIE* Vol. 6499 (2007), and select any control target processors or data target processors accordingly.

Each processor may comprise a plurality of memory cells in which the inputs to the instruction, which may be received over the communication means, can be stored. Each processor may comprise a plurality of memory cells in which addresses of control target processors can be stored. All memory in every processor may be set to a fixed value on power up so that the processors do not execute arbitrary programs as would otherwise be the case with arbitrary values being set on power up.

The processors may be each arranged to perform an instruction once in each of a series of operating cycles, and the communication means may comprise a plurality of pipes each arranged to transmit data in a respective direction. Each processor may comprise a plurality of output means each arranged to output data onto a respective one of the pipes in the form of tokens. At least one of the output means may be arranged to output two tokens onto the same pipe in one operating cycle of the processor.

Indeed the present invention further provides a processing system comprising a plurality of processors each arranged to perform an instruction once in each of a series of operating cycles, and communication means arranged to carry messages between the processors, wherein the communication means comprises a plurality of pipes each arranged to transmit data in a respective direction, and each processor comprises a plurality of output means each arranged to output data onto a respective one of the pipes in the form of tokens, at least one of the output means being arranged to output two tokens onto the same pipe in one operating cycle of the processor.

Each pipe may comprise a plurality of memory frames. The communication means may be arranged to transfer tokens between adjacent pipe frames, to carry the messages, at a pipe frequency which may be higher than that of the operating cycle of the processors.

The processor may be arranged to output two tokens to the same pipe frame at different times within the operating cycle of the processor and the communication means may be arranged to transmit the first of the tokens to another pipe frame before the second token is output onto the pipe.

The present invention further provides a method of setting up a processing system according to the invention. The method may comprise loading a respective re-routing address into the re-routing address memory field of a plurality of the processors. The method may comprise loading a respective delivery instruction into the delivery instruction memory field of a plurality of the processors. The method may thereby define a route along which data can be communicated between a plurality of the processors, Preferred embodiments of the present invention will now be described by way of example only with reference to the accompanying drawings in which:

Figure 1:
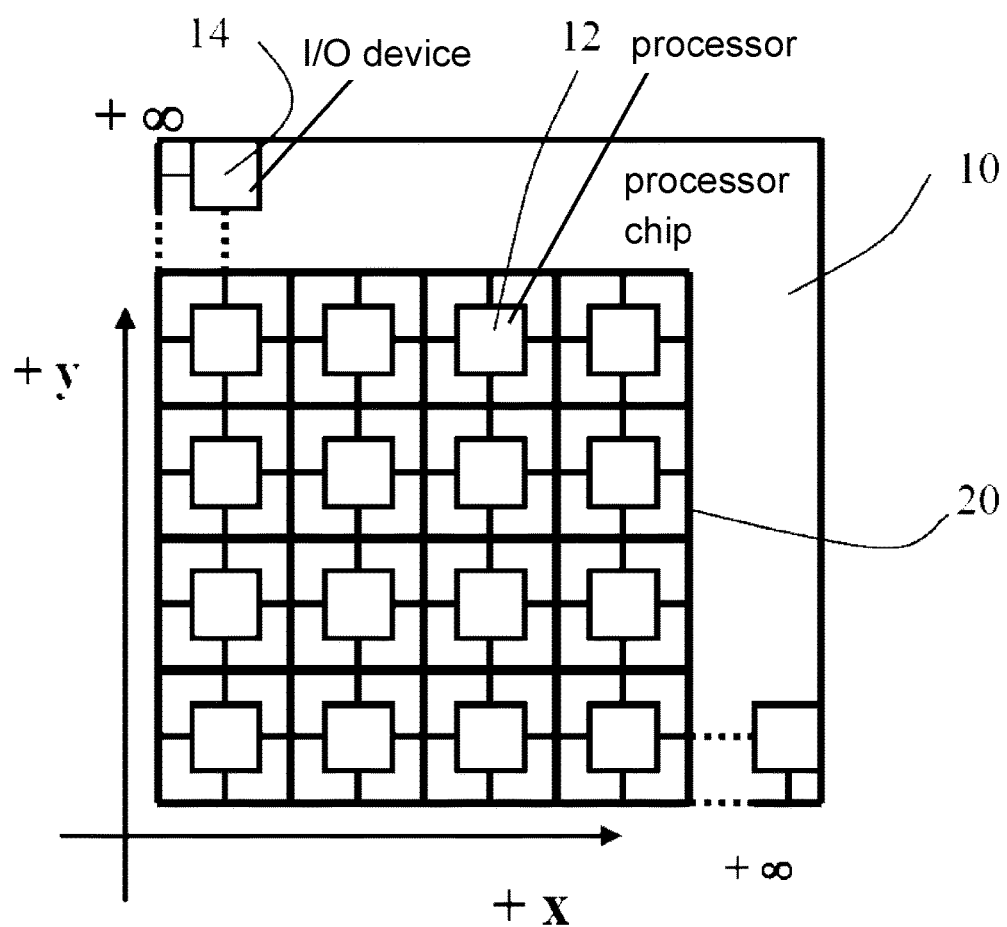
FIG. 1 is a schematic diagram of a processor chip according to an embodiment of the invention.

Referring to FIG. 1, a processor chip 10 comprises a two dimensional rectangular array of processors 12. Each processor or tuple 12 has an address defined by perpendicular coordinates x, y. The main array is of finite size with addresses having y coordinates centred on the origin and extending from $-y_{max}$ to $+y_{max}$ and x coordinates also centred on the origin and extending from $-x_{max}$ to $+x_{max}$. At each end of each row and each column of the main array of processors 12 is an input/output processor or I/O device 14 which has either an x coordinate of $+\infty$ or $-\infty$ or a y coordinate of $+\infty$ or $-\infty$. Only one quarter of the chip 10 is shown in FIG. 1, which is in the positive quadrant of the coordinate system. A number of chips can be combined to form a single machine with data moving from one chip to the next via the I/O devices 14.

Figure 2:
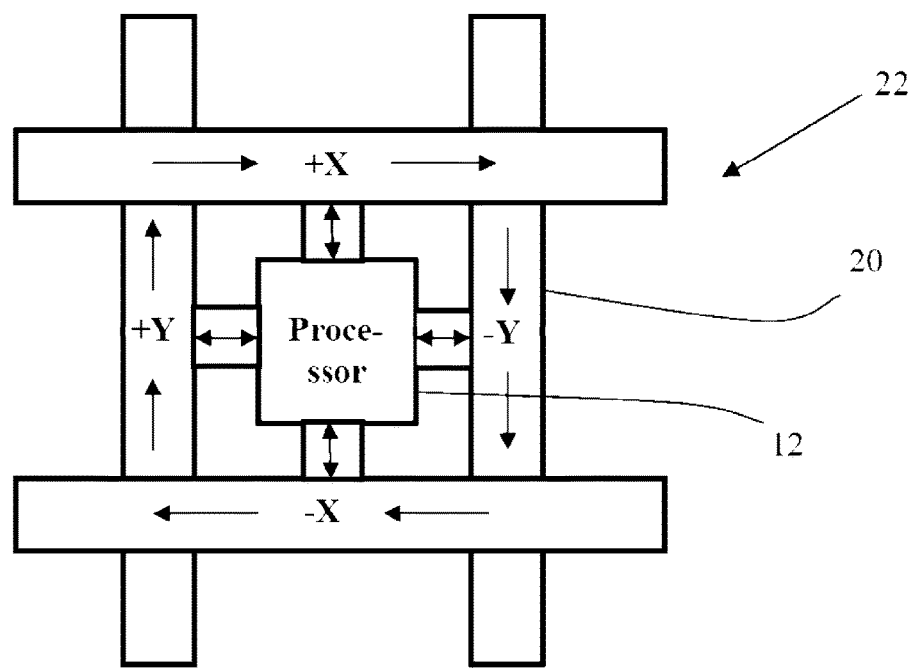
FIG. 2 is a schematic view of one processor and sections of pipes of the chip of FIG. 1.

A series of pipes 20 are laid out in a rectangular grid between the processors 12. Between each column of processors 12, there are a pair of pipes extending in the y direction, one +Y being arranged to transfer data in the positive Y direction and the other −Y being arranged to transfer data in the negative Y direction. Between each row of processors 12, there are a pair of pipes extending in the X direction, one +X being arranged to transfer data in the positive X direction and the other −X being arranged to transfer data in the negative X direction. Each pair of pipes 20 is shown as a single line in FIG. 1, but the parts of the individual pipes 20 surrounding one of the processors 12 are shown in FIG. 2. FIG. 2 therefore shows a single processor tile 22 which forms a basic unit which is repeated across the chip 10 to build up the entire chip. Each processor 12 is connected to each of the four pipes 20 that are adjacent to it on its four sides, so that each processor can put data onto the appropriate pipe for it to be transmitted in any of the four directions.

Figure 3:
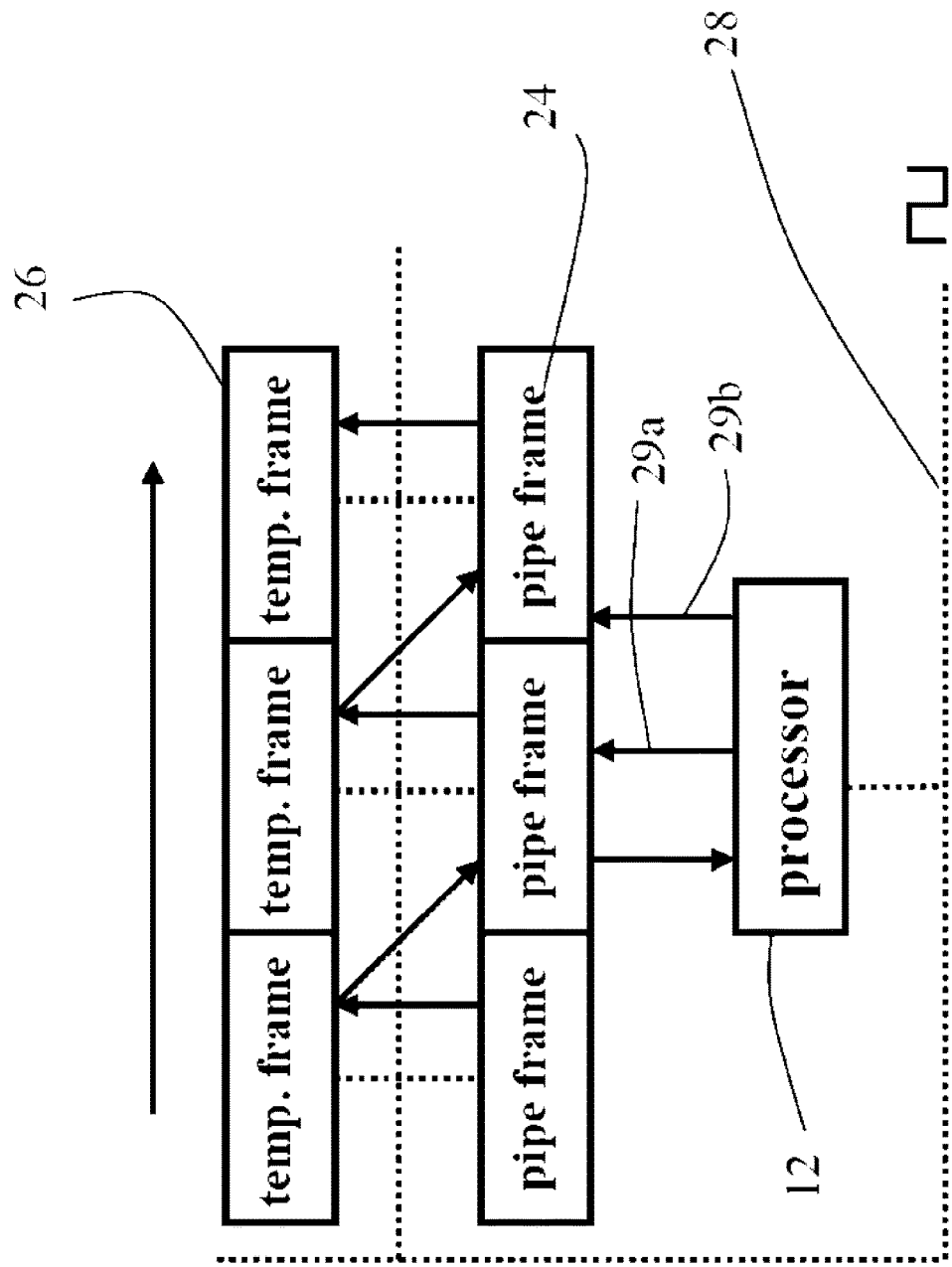
FIG. 3 is a schematic diagram of a part of one of the pipes of the chip of FIG. 1.

Referring to FIG. 3, each of the uni-directional pipes 20 comprises a series of pipe frames 24 each of which is made up of a number of memory cells, and a parallel series of temporary frames 26 each of which is made up of the same number of memory cells. Each of the temporary frames 26 is connected to two adjacent pipe frames 24 so that it can receive data from one of them and output data into the other of them. Therefore data can be transmitted along the pipe by being transferred from one pipe frame 24 to the next one in the direction of the pipe, via the appropriate temporary frame 26. Each processor 12 is connected to one of the pipe frames 24 on each of the pipes that pass adjacent to it, so that it can accept data from the pipe, and write data to the pipe at that point. Each processor 12 has two output channels 29a 29b which allow the processor to put two outputs onto the pipe so that they will be transmitted in different pipe frames 24. These are shown schematically as parallel channels formed of parallel wires, communicating with adjacent pipe frames 24, but can, in practice, be in the form of a single wire which can transmit two outputs using time multiplexing to provide the two channels. In that arrangement the processor is arranged to output two tokens to the same pipe frame at different times within the operating cycle of the processor and the pipe is arranged to transmit the first of the tokens to another pipe frame before the second token is output onto the pipe.

All of the processors 12 and all of the pipe frames 24 and temporary frames 26 are connected to a common clock line 28, on which a clock signal is transmitted. This is used to coordinate the timing of the transfer of data along the pipes 20 and between the pipes 20 and processors 12, as well as the performance of instructions by the processors. The data in a pipe frame is copied to its adjacent pipe frame, via a temporary pipe frame, every clock tick. Generally the moving of data between pipe frames 24 occurs at a frequency that is higher than the frequency at which each of the processor 12 performs its instruction. This allows a processor 12 to transmit more than one datum along a single pipe in one processor operating cycle, with each datum being put onto the pipe 20 via a respective one of the output channels 29a, 29b. The processors can each perform their instruction once very operating cycle. All the processors have the same operating cycle length, or 'processor clock tick', which may be equal in length to two or more pipe clock ticks. Barring fabrication errors, processors 12 have a neighbouring tuple on either side, and I/O tuples have a neighbouring tuple on exactly one side.

Each processor 12 is arranged to perform its instruction, which may be the same single instruction for all of the processors, having the form:

$$u \times v + w \rightarrow r'$$

$$\text{write}(r', r)$$

$$\text{jump}(r', l, z, g, n)$$

as described in international patent application No. PCT/GB2008/001821. Alternatively the processors 12 may perform different instructions and each processor may be arranged to perform more than one instruction.

Each processor 12 has a buffer that accepts tokens from the pipe 20. When the processor 12 computes it copies the buffer into internal registers and operates on the internal registers.

Messages on the pipe 20 are transmitted in the form of tokens. Each token in this embodiment is either a data token or a control token, or both, as indicated by an appropriate flag or flags within the token. Each processor 12 is arranged to receive data in the form of data tokens, and to perform its instruction when it receives a control token. When it has performed its instruction, each processor 12 can send on data as part of an output message in the form of a token which may include the result of the instruction, to one or more other processors 12 in the form of data tokens, and pass control to one or more other processors 12 using a control token. Therefore it will be appreciated that each processor 12 needs to be able to output two or more tokens onto the pipes 20 each time it performs its instruction, i.e. in each processor operating cycle. These tokens may be placed onto different pipes 20 to be transmitted in different directions, but they may be placed on the same pipe 20 for transmission in the same direction, and this is enabled by the multiple output channels 29a, 29b. In some cases more than two output channels may be required on each edge of the processor.

Figure 4:
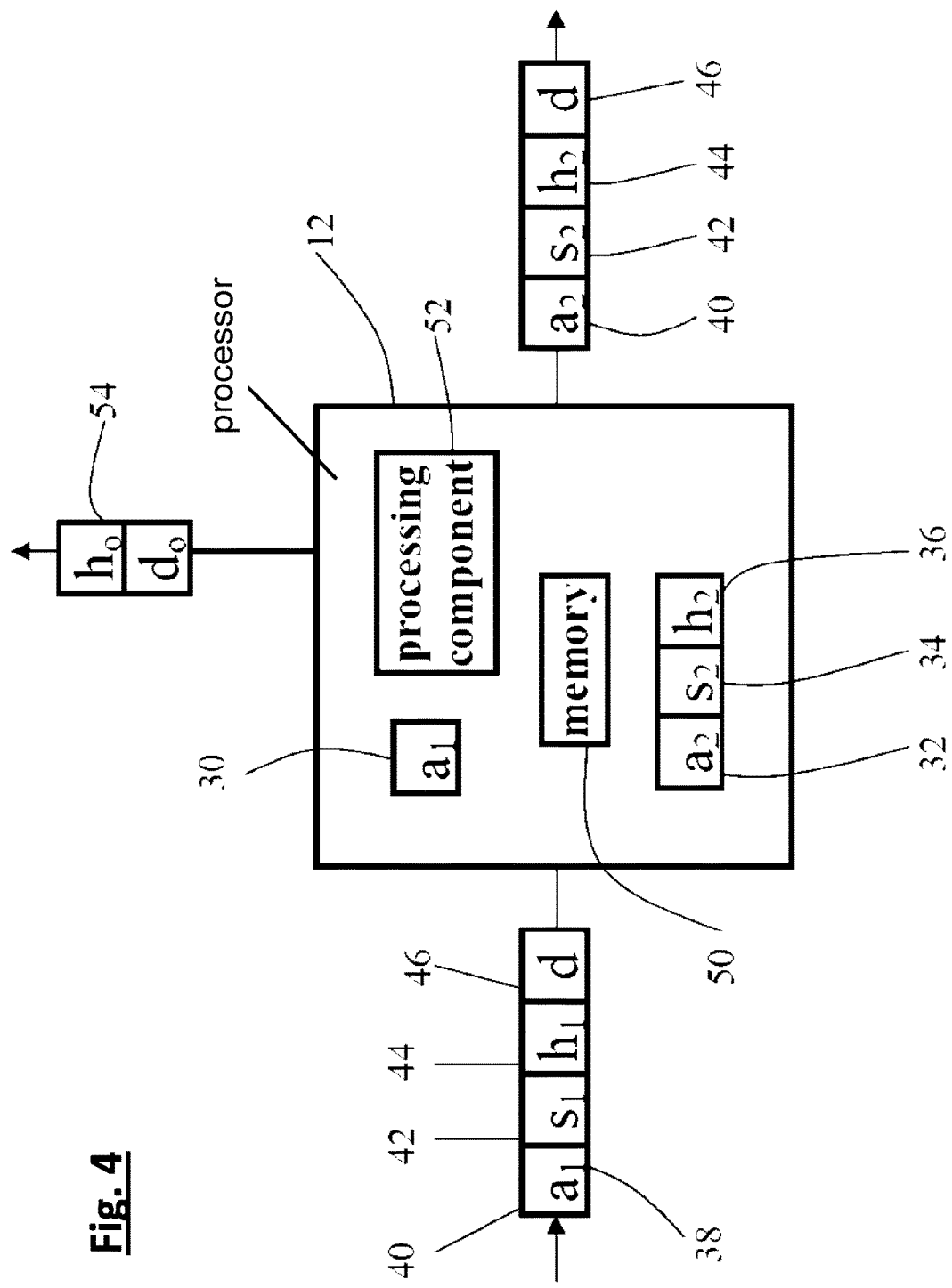
FIG. 4 is a diagram showing the input and re-routing output of the processor of FIG. 2.

Referring to FIG. 4, each processor 12 includes a memory store 50 in which received data can be stored and processing components 52 which are arranged to perform an instruction producing a result which can be included in a processing output message 54 for transmission to another processor. The format of the processing output message can be the same as the received message, but will generally include a header $h_o$ and data $d_o$. In addition to its ability to perform one or more instructions to generate the processing output, each processor is arranged to perform a re-routing function on a received token. To achieve this, each of the processors 12 includes an 'own address' memory field 30 in which its own address $a_1$ is stored, a hopping address field 32 in which a hopping address $a_2$ can be stored, a delivery instruction field 34, 36 which includes a store instruction field 34 and hop instruction field 36, each of which contains a one bit flag having two states: a 'set' state and a 'cleared' state. More generally the delivery instruction can be considered as a single instruction that can have any of a fixed number of states, in this case four, indicating whether the message is to be hopped (re-routed) at the next processor and whether the message is to be stored at the next processor. The delivery instruction is independent of the processor at which it is stored and the re-routing address to which it is to be sent.

The processor 12 is arranged to receive a message in the form of a token 38 which includes a data field 46 including data d, and a header which holds operating instructions indicating what operations the processor is to perform on the data, The header includes an address field 40, a delivery instruction field including a store instruction field 42, and a hop instruction field 44. The address field 40, which may be considered a target address field, includes the address $a_1$ of the target processor to which the token is being sent, the store instruction field 42 contains a store instruction which, in this case, is in the form of a one bit flag, which can be set or cleared, indicating whether the data is to be stored at the target processor, and the hop instruction field 44 contains a hop instruction which, in this case, is in the form of a one bit flag, which can be set or cleared, indicating whether the data is to be 'hopped' i.e. sent on from the target processor to another processor.

Each processor is therefore arranged so that it can act as a 'signpost' which receives a message addressed to it together with a flag indicating whether it is to be sent on. If the message is to be sent on, the processor inserts a new address into the message, inserts a further delivery instruction into the message indicating whether it is to be stored and/or sent on again from the next processor, and sends the message on to the next processor. In order to achieve this, when the message 38 arrives at the processor 12, the processor 12 is arranged to compare the address $a_1$ in address field 40 of the message with its own address. If these addresses do not match, the message is not addressed to the processor, so it simply allows the message to move on along the pipe. If the addresses do match, the processor 12 checks the store instruction field 42 and the hop instruction field 44 in the received message. If the store instruction flag $s_1$ is set indicating that the data in the message is to be stored, the processor 12 stores the data within its own memory 50, for example so that it can perform an instruction on the received data using the processing components 52 to produce a result which can also be placed on the pipe as a 'processing output' 54 for transmission to another processor. If the store instruction flag $s_1$ is clear indicating that the data is not to be stored, then it is not stored. If the hop instruction flag $h_1$ is set to indicate that the data is to be hopped to another processor, then the processor 12 is arranged to insert the address $a_2$ from its hop address field 32 into the message as a new target address in the address field 40, replacing its own address $a_1$ which is currently there, and insert the delivery instruction from its delivery instruction field 34, 36 into the message. Specifically this includes updating the header fields 40, 42, 44 of the message by inserting the store instruction flag $s_2$ from its store instruction field 34 and the hop instruction flag $h_2$ from its hop instruction field 36 into the appropriate fields of the message to replace the delivery instruction which is currently there. Then, the processor 12 is arranged to place the message 38 onto the appropriate one of the pipes 20, as a re-routing output, for delivery to the processor identified in the hop address field. The target processor address $a_2$ and the store and hop instructions $s_2$, $h_2$ are retained in the appropriate memory fields of the processor 12, so that any further tokens targeted to the processor can also be re-routed along the same route.

If the hop instruction flag $h_1$ in the received message is clear indicating that the message is not to be transmitted on to another processor, then the processor 12 can either not re-transmit the message at all, or it can place it on the pipe as an empty token, for transmission to, and re-use by, another processor. Marking both the hopping instruction field and the store instruction field of the re-transmitted token as clear can be used to mark the token as empty.

The format of the message may vary, but in this case it only includes one address field 40, one store instruction field 42 and one hop instruction field 44. Therefore, when the message is received and sent on by a processor, the address of that processor in the message is simply replaced by the new target processor address $a_2$ taken from the hopping address field 32, and the store instruction flag and hopping instruction flag in the incoming message are replaced by the new store and hopping instructions taken from the memory fields 34, 36. This means that the message can be sent along an arbitrarily long route between processors without the size of the message increasing as the length of the route increases, as each time it is put on the pipe it only needs to include the address and delivery instructions for the next processor along the route. Also, because each processor can produce two output messages, one processing output including the result of performing its instruction on received data, and one re-routing or hopping output which re-routes the received data to another processor, this allows a branching of the line of communication through the processor. More generally, the processing output and the hopping output can be sent to a plurality of processors, for example any number of copies of each type of output can be sent to different processors, either being sent out in the same direction or in different directions. The number of output channels on each edge of the processor may be greater than two if required. This supports a wide range of parallel programming idioms which may be supported by a compiler of parallel processing languages.

It will be appreciated that, with the address $a_2$ stored in the hopping address field 32, and the delivery instruction stored in the delivery instruction field 34, 36, a route can be defined from one of the processors to another via any number of intermediate processors. The route can be arbitrarily complex and arbitrarily long because the route is defined by data stored at the processors on the route, with the token being communicated along the route at any one time carrying data that defines a fixed small part only, typically of one or two steps, of the route. In this embodiment the chip 10 is programmable, and the address $a_2$ stored in the hopping address field 32, and the delivery instruction $s_2$ $h_2$ stored in the delivery instruction field 34, 36, can be set as required. In some programs the route is fixed by the compiler so that any data sent by the first processor in the route to the second, with a hopping instruction to send the data on, will proceed along the route to the final target processor at the end of the route. In other programs the compiler generates a program which can over-write addresses and delivery instructions so as to switch a data flow. This may be done, for example, to divert a data stream when some target data in the stream have been detected. In this way, the string processing functions of an ordinary computer can be implemented in a parallel computer.

In other embodiments, such as in a field programmable gate array (FPGA) system or an application specific integrated circuit (ASIC), while the program is running the route remains fixed so that any data sent by the first processor in the route to the second, with a hopping instruction to send the data on, will proceed along the route to the final target processor at the end of the route. However the chip can be re-programmed by loading a different set of addresses and delivery instructions into the appropriate fields of the processors, so that different programs can be run. In other embodiments the chip may be non-programmable with the stored addresses and delivery instructions being fixed.

In other embodiments, the message can be made more complex. For example it can include two address fields within a routing address field, each address field holding one processor address. The two addresses can then be updated alternately as the message is transmitted from processor to processor along the route. Similarly there may be two delivery instruction fields each associated with one of the address fields which can be updated alternately. This still keeps the routing part of the message to a fixed length, by replacing a used address and delivery instructions with new addresses and delivery instructions. In this case the re-routing address at the processor may not replace the processor's own address but may replace a previous address which has already been used as a target address. Alternatively the re-routing address may be inserted so as not to form the target address in the immediately re-transmitted message, but so as to be used as a target address in a subsequent hop, the target address for the immediate re-transmission being already present in the message. Therefore the processor may place the message on the pipe for delivery either directly or indirectly to the re-routing address.

Figure 5:
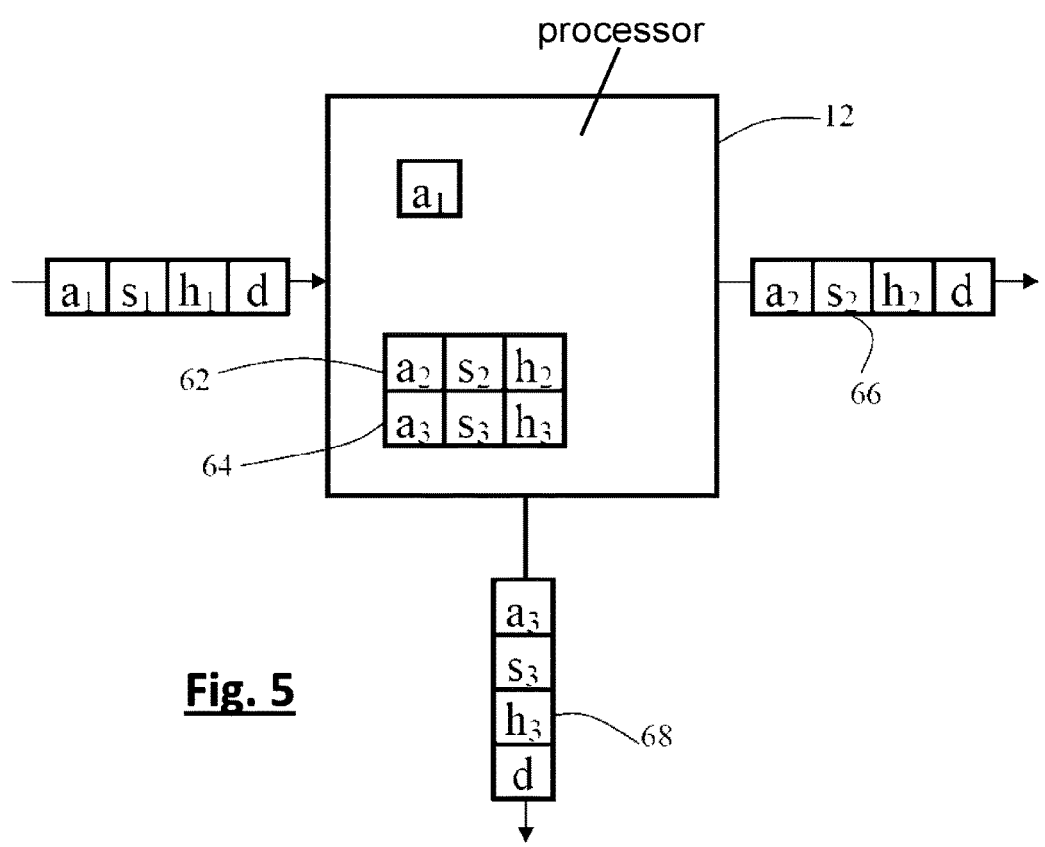
FIG. 5 is a diagram showing the input and output of the processor 12 of FIG. 2 operating in a different mode.

Referring to FIG. 5, in a further embodiment any one of the processors 12 can be arranged to re-transmit the received message as two separate messages or tokens 66, 68 to two target processors, which may be on the same or different pipes. This provides a further mechanism for the communication line within the system to branch. In order to do this, each processor includes two hopping address/instruction fields 62, 64 which can contain the addresses $a_2$, $a_3$ of two separate target processors, and two associated two-part delivery instructions $s_2$, $h_2$, $s_3$, $h_3$ for the respective target processor. In this case, if the received message has the hop instruction field flagged, then the processor 12 is arranged to place two output tokens on the pipe, one addressed to each of the target processors identified by the addresses stored in the two address/instruction fields 62, 64. It will be appreciated that in this arrangement the size of the received message does not need to change, depending on how many processors it is to be 'hopped' or retransmitted to. Each processor that receives the message only needs the message to flag whether it is to be hopped on or not, and if it is, all of the information required to perform the re-transmission is stored at the processor.

Figure 6:
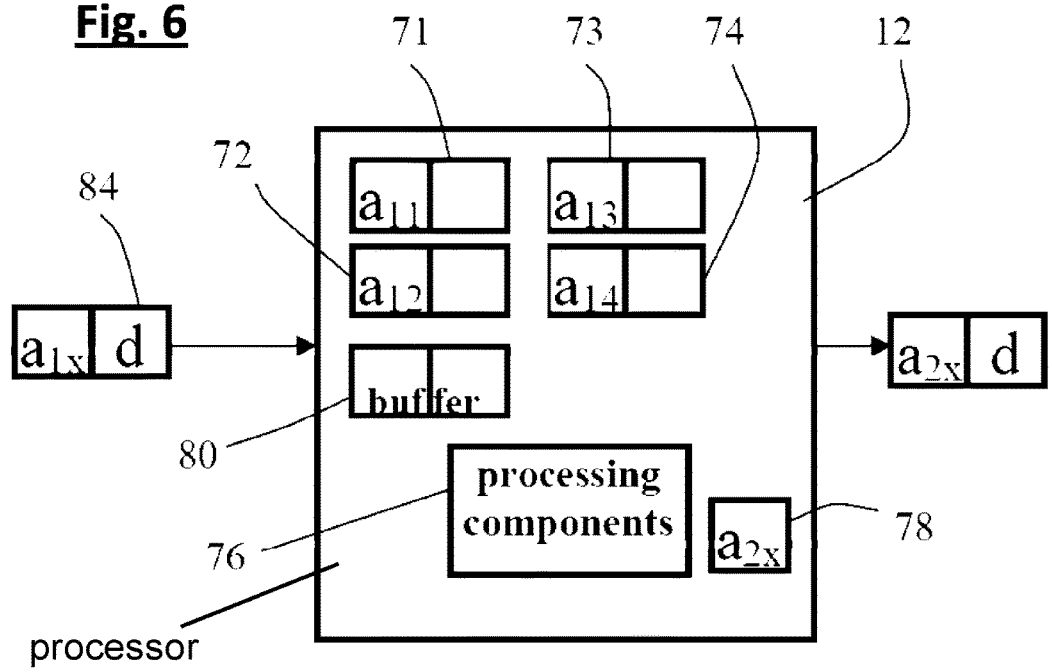
FIG. 6 is a schematic diagram of a processor forming part of a further embodiment of the invention.

Referring to FIG. 6, in another embodiment the processor 12 has a number if internal registers, in this case four 71, 72, 73, 74 are shown. Three of these 71, 72, 73 are used to store the inputs to the instruction which the processor is arranged to perform, and one 74 is arranged to store the result of the instruction. Each register has its own address, $a_{1x}$ where $a_1$ is the address of the processor 12 and x indicates which register within the processor is being addressed. The processor 12 further comprises processing components 76 arranged to perform the instruction, and a hopping address field 78 arranged to store a hopping address, in the form $a_{2x}$ where $a_2$ identifies the target processor to which the token is to be forwarded, and x indicates the register within the target processor to which the token is addressed. Each received token 84 includes a target address $a_{1x}$ and data d. On receipt of a token addressed to the processor 12, the processor copies the token into a buffer 80. If the token is addressed to one of the registers 71, 72, 73 then it is copied into that register. If it is addressed to the result register 74, then it is not copied into that register, but is forwarded on to another processor by replacing the target address in the token with the address stored in the hopping address field 78. The result register address of each processor is therefore used as a sink register address. This means that the token can be made to follow a route which can be arbitrarily long and complex, by being forwarded, or hopped, repeatedly with the sink address, in this case the result register address, of each processor on the route being used as the hopping address. When the target address of a non-sink register, such as registers 1 to 3 in the processor of FIG. 6, is inserted into the token, the processor at which it is inserted will be the penultimate processor in the route, and the token will be delivered to the final target register at the final processor in the route, and will not be forwarded further. Therefore in this embodiment the full register address, as stored and as inserted in the token, includes one high level part which identifies the processor to which the token is to be sent, and another low level part which determines both whether the token is to be hopped or stored and, if stored, in which register. This therefore enables the data in the token to be forwarded along a route of any length and complexity, but without being delivered to any of the processors along the route, except the final one.

In a modification to the embodiment of FIG. 6, each processor has a delivery instruction memory field containing a hopping instruction, which can be a single bit as in the embodiment of FIG. 4. In this case each incoming token includes a target register address, a hopping instruction, and data. The hopping instruction determines whether the data is hopped on to another processor or not. The target register address will either be for one of the non-sink registers, in which case the processor is arranged to store the data in the appropriate register, or it will be the sink register address, in which case the data will not be stored. Therefore the default is to store the data in the register the token is addressed to, but if that is the sink register then the data will not be stored. Therefore, in this arrangement also, the full register address, as carried in the token and as stored in each processor for insertion into the token, includes a high level part which identifies the processor to which the token is to be forwarded and a low level part which determines whether the token is to be stored and, if so, in which register. This arrangement therefore allows the data to be forwarded along an arbitrarily complex route with the option of storing the data at any of the processors along the route.

It will be appreciated that both the system of FIG. 6, and the modification to that system described above, use the presence of a sink register in each processor, to which incoming data will never need to be input. If no such sink register is present, then each processor can still have sink address associated with it, which is equivalent to a register address but is not associated with any specific register. The processor therefore has more register addresses associated with it than it has registers. Alternatively a system such as that of FIG. 4 can be used in which delivery instructions are used with one bit to control storing and one to control hopping.

Each of the embodiments described above can be modified by the inclusion in the token of a fetch bit (f), or a longer fetch instruction, which instructs the processor whether or not to replace the datum in an outgoing token with the contents of one of the processor's memory locations. In this case each processor is arranged to include a fetch instruction memory field so that the processor can insert the fetch instruction into the token with the target address, and hop and store instructions if appropriate, when forwarding the token along the route.

Similarly any of the embodiments described above can modified so that the token includes a control bit (c) which instructs the processor the token is addressed to whether or not to execute its instruction or program. In this case each processor also has a control instruction memory field containing a control instruction which can be inserted into the token when forwarding the token along the route.

It will be appreciated that the embodiments described above are examples of the more general case in which any operation code may be used which forms part of the token and which is arranged to instruct the processor to which it is addressed to perform an associated operation, the operation code to be forwarded to each processor on the route being stored at a previous processor. The operation may be performed on the token, or some data it contains, as it is delivered to a processor along the route, as it is forwarded, or as it is delivered to the final destination of the route.

The re-routing or 'hopping' methods described above can be used to perform a number of functions within the processing system. The simplest process is to re-route a token at one of the processors 12 to change the direction in which it is travelling. For example in a simple square processor array a message can in theory be sent from any processor to any other by travelling the required distance in the X direction and then the required distance in the Y direction, with the processor at the point of change of direction performing the re-routing function. Clearly more complex routes can be laid out as required.

Other applications make use of the dual function of storing the received data and generating a re-routing output including the received data. One such application of the re-routing function is to initialize a vector, or linear row of processors to the same datum. This can be achieved by sending a message from one end of the row (or column) with delivery instructions for each processor to store the datum from the message and send the message on to the next processor in the row (or column). A two-dimensional array of processors can be initialized in a similar way, by further generating a re-routing output from each processor in the initial row, with the message being sent a long one row, and each processor in the row being arranged to store the datum, send the message on along the row, and also re-route it in the perpendicular direction down the respective column.

Figure 7:
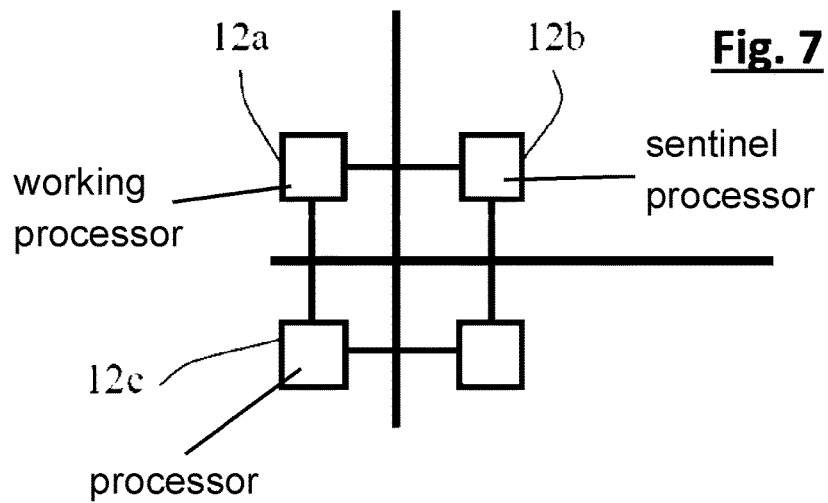
FIG. 7 is a schematic diagram of a processing system according to a further embodiment of the invention.

Referring to FIG. 7, in another application, one of the processors 12a is designated as a working processor and another 12b is designated as a sentinel processor. The working processor 12a is arranged to perform an instruction to generate a result, and to send the result to another processor 12c, for example for further processing, and also to send the result on to the sentinel processor 12b (whose address is stored at the working processor 12a). The three processors 12a, 12b, 12c are shown as being adjacent to each other but they can be further apart. The sentinel processor 12b is arranged to check the result that it receives and respond in one of a number of ways depending on the result. For example the sentinel processor 12b may be arranged, if the result meets one or more conditions, to transmit a message back to the working processor 12a to stop it outputting any further results. Alternatively the sentinel processor 12b may be arranged to send a message to a further processor if the result meets one or more conditions. The advantage of the use of the embodiments described above in this application is that the result can be stored and sent to the sentinel processor 12b without the need for any message headers to include more than one address and delivery instructions made up of at most two bits.

The invention claimed is:

1. A processing system comprising a plurality of processors on a chip, each of the processors being arranged to execute at least one processor instruction, a common clock line to which the processors are connected and which is arranged to carry a clock signal for coordination of the execution of the processor instructions, and a bus arranged to carry a message between the processors, the message including operating instructions including a current target address, wherein each of the processors:

has an associated address;

has an operating instruction memory field arranged to hold a stored operating instruction including a re-routing target address associated with a re-routing target processor; and is arranged to receive the message as a received message and, on receipt of the received message, to operate as a current processor wherein the current processor is arranged to:

check the current target address of the received message to determine whether the current target address of the received message corresponds to the associated address of the current processor;

only if the current target address of the received message does correspond to the associated address of the current processor, check the operating instructions in the received message to determine whether the received message is to be re-routed; and if the received message is to be re-routed, replace one of the operating instructions within the received message with the stored operating instruction of the current processor to form a re-routed message, and place the re-routed message on the bus for delivery to the re-routing target address.

2. The system according to claim 1 wherein the received message includes an operating instruction field holding at least two addresses including the current target address, and, if the received message is to be re-routed, the current processor is arranged to replace one of the addresses in the operating instruction field of the received message with the re-routing target address.

3. The system according to claim 2 wherein the one of the addresses is the associated address of the current processor.

4. The system according to claim 1 wherein the operating instructions in the received message include at least one re-routing instruction which indicates whether the received message is to be re-routed at the current processor, and the current processor is arranged, if the received message is to be re-routed, to replace the at least one re-routing instruction in the received message with a re-routing instruction from the operating instruction memory field of the current processor.

5. The system according to claim 4 wherein the re-routing instruction from the operating instruction memory field of the current processor has a fixed number of possible states indicating, independently of the current processor and the re-routing target address to which the re-routed message is to be sent, whether the re-routed message is to be re-routed from the re-routing target processor.

6. The system according to claim 1 wherein the operating instruction memory field is further arranged to store a store instruction indicating whether the re-routed message is to be stored at the re-routing target processor.

7. The system according to claim 1 wherein the current processor is arranged to determine from the received message whether the received message is to be stored, and if the received message is to be stored, to store at least a part of the received message.

8. The system according to claim 1 wherein the current processor has a plurality of associated addresses, one of the plurality of associated addresses being a sink address, and the current processor is arranged, if the current target address is the sink address, to re-route the received message.

9. The system according to claim 8 wherein the current processor is arranged, if the current target address is one of the plurality of associated addresses other than the sink address, to store at least a part of the received message at the current target address.

10. The system according to claim 1 wherein each of the processors requires an input, and the current processor is arranged to execute one of the processor instructions using a part of the received message as the input, to produce an output as a result of executing the one of the processor instructions and to place the output on the bus for delivery to another one of the processors.

11. The system according to claim 1 wherein the operating instruction memory field of each of the processors includes a further address memory field arranged to hold a respective further re-routing target address associated with a respective further re-routing target processor and the current processor is arranged, if the received message is to be re-routed, to also place the received message on the bus as a further re-routed message for delivery to the further re-routing target address held in the further address memory field of the current processor.

12. The system according to claim 11 wherein each of the processors has a further re-routing instruction memory field for holding a respective further re-routing instruction and the current processor is arranged, if the received message is to be re-routed, to insert the further re-routing instruction held in the further re-routing instruction memory field of the current processor into the received message to indicate to the further re-routing target processor at the further re-routing target address field held in the further address memory field of the current processor, how the received message is to be delivered.

13. The system according to claim 1 wherein each of the processors of the plurality of processors is each arranged to execute the at least one processor instruction once in each of a series of operating cycles, and the bus comprises a plurality of pipes each arranged to transmit data in a respective direction, and each of the processors comprises a plurality of outputs each arranged to output data onto a respective one of the pipes in the form of tokens, at least one of the outputs being arranged to output two tokens onto the same pipe in one operating cycle.

14. A method of communicating a message between a plurality of processors of a processing system, wherein the processing system comprises the plurality of the processors on a chip, each of the processors of the plurality of processors being arranged to execute at least one processor instruction, and a common clock line, for carrying a clock signal, to which the processors are connected for coordination of the execution of the processor instructions, the method, comprising:

receiving the message at a current processor included in the plurality of processors which has an associated current address, the message including operating instructions which comprise a target address;

on receipt of the message, checking the target address to determine whether the target address corresponds to the current address;

only if the target address does correspond to the current address, checking the operating instructions to determine whether the message is to be re-routed; and if the message is to be re-routed, replacing an address within the message with a re-routing target address to enable re-routing of the message to the re-routing target address.

15. The method according to claim 14 wherein the address, within the message, that is replaced, is the current address, and the operating instructions within the message include a first re-routing instruction, the method including determining whether the message is to be re-routed and, if the message is to be re-routed, replacing the first re-routing instruction within the message with a second re-routing instruction.

16. The method according to claim 15 wherein the second re-routing instruction has a fixed number of possible states indicating, independently of the current processor at which the second re-routing instruction is stored and the re-routing target address to which the message is to be sent, whether the message is to be re-routed from a re-routing target processor.

17. The method according to claim 14 wherein the operating instructions comprise a store instruction indicating whether the message is to be stored at the current processor, the method including determining whether the message is to be stored and, if the message is to be stored, storing at least a part of the message.

18. The method according to claim 14 further comprising the current processor executing the at least one processor instruction that it is arranged to execute using a part of the message as an input, and producing an output as a result of executing the at least one processor instruction that it is arranged to execute and delivering the output to another processor.

19. The method according to claim 14 further comprising, if the message is to be re-routed, providing a copy of the message, and inserting a further re-routing target address having a further re-routing target processor associated therewith into the copy of the message to enable delivery of the message to the further re-routing target address, and if the message is to be re-routed, inserting a further re-routing instruction into the copy of the message to indicate to the further re-routing target processor whether the message is to be re-routed from the further re-routing target processor.

20. The method according to claim 14 including loading a respective re-routing target address into a re-routing address memory field of each processor of the plurality of the processors thereby to define a route along which data can be communicated between the plurality of the processors.

* * * * *